United States Patent [19]

Tiitola et al.

[11] Patent Number: 5,407,195
[45] Date of Patent: Apr. 18, 1995

[54] BLADE CONSTRUCT FOR A HOCKEY STICK OR THE LIKE

[75] Inventors: Antti-Jussi Tiitola, Kaivanto; Mauri Laitinen, Mikkeli, both of Finland

[73] Assignee: K.C.G. Hockey Finland Oy, Forssa, Finland

[21] Appl. No.: 957,615

[22] Filed: Oct. 6, 1992

[51] Int. Cl.⁶ ............................................. A63B 59/12
[52] U.S. Cl. ................................................. 273/67 A
[58] Field of Search ................. 273/67 A, 735, 167 H, 273/67 R; 156/78

[56] References Cited

U.S. PATENT DOCUMENTS

| | | | |
|---|---|---|---|
| D. 244,790 | 6/1977 | Carlson et al. | 273/67 A |
| 2,304,322 | 7/1941 | Werlich | 273/67 A |
| 2,762,739 | 9/1956 | Weiss | 156/65 |
| 2,774,596 | 10/1955 | Bredenberg | 273/67 A |
| 3,533,623 | 10/1967 | Dumont | 273/67 A |
| 3,544,104 | 12/1970 | Jenks | 273/67 A |
| 3,561,760 | 2/1971 | Klay | 273/67 A |
| 3,934,875 | 1/1976 | Easton et al. | 273/67 A |
| 3,970,324 | 7/1976 | Howat | 156/78 |
| 3,982,760 | 9/1976 | Tiitola | 273/67 A |
| 4,013,288 | 3/1977 | Goverde | 273/67 A |
| 4,059,269 | 11/1977 | Tiitola | 273/67 A |
| 4,076,240 | 2/1978 | Haddad | 273/67 A |
| 4,084,818 | 4/1978 | Goupil et al. | 273/67 A |
| 4,124,208 | 11/1978 | Burns | 273/67 A |
| 4,148,482 | 4/1979 | Harwell, Jr. et al. | 273/67 A |
| 4,172,594 | 10/1979 | Diederich | 273/67 A |
| 4,358,113 | 11/1982 | McKinnon et al. | 273/67 A |
| 4,361,325 | 11/1982 | Jansen | 273/67 A |
| 4,369,970 | 1/1983 | Salminen | 273/67 A |
| 4,488,721 | 12/1984 | Franck et al. | 273/67 A |
| 4,504,344 | 3/1985 | Helle et al. | 273/67 A |
| 4,537,398 | 8/1985 | Salminen | 273/67 A |
| 4,591,155 | 5/1986 | Adachi | 273/67 A |
| 4,600,192 | 7/1986 | Adachi | 273/67 A |
| 5,050,878 | 9/1991 | Deleris | 273/67 A |
| 5,160,135 | 11/1992 | Hasegawa | 273/67 A |

FOREIGN PATENT DOCUMENTS

| | | | |
|---|---|---|---|
| 1047561 | 1/1979 | Canada | 273/67 A |
| 65018 | 12/1982 | Finland | 273/67 A |
| 3238117 | 6/1983 | Germany | 273/67 A |
| 3238117 | 3/1994 | Germany . | |
| 9305219 | 3/1993 | WIPO . | |

Primary Examiner—Mark S. Graham
Attorney, Agent, or Firm—Fay, Sharpe, Beall, Fagan, Minnich & McKee

[57] ABSTRACT

The present invention relates to a blade construct for a hockey stick or the like. The blade construct has a blade body comprising a first face member, and a second opposed face member. The first and second face members are spaced apart and are of fiber reinforced plastics material. The blade construct is characterized in that, a core cavity member is sandwiched between the first and second face members. The core cavity member comprises one or more bridge members of fiber reinforced plastics material. The first face member, the second face member and the bridge members are integral, and one or more of the bridge members comprises a fiber reinforcing component oriented transversely with respect to the first and second face members.

31 Claims, 4 Drawing Sheets

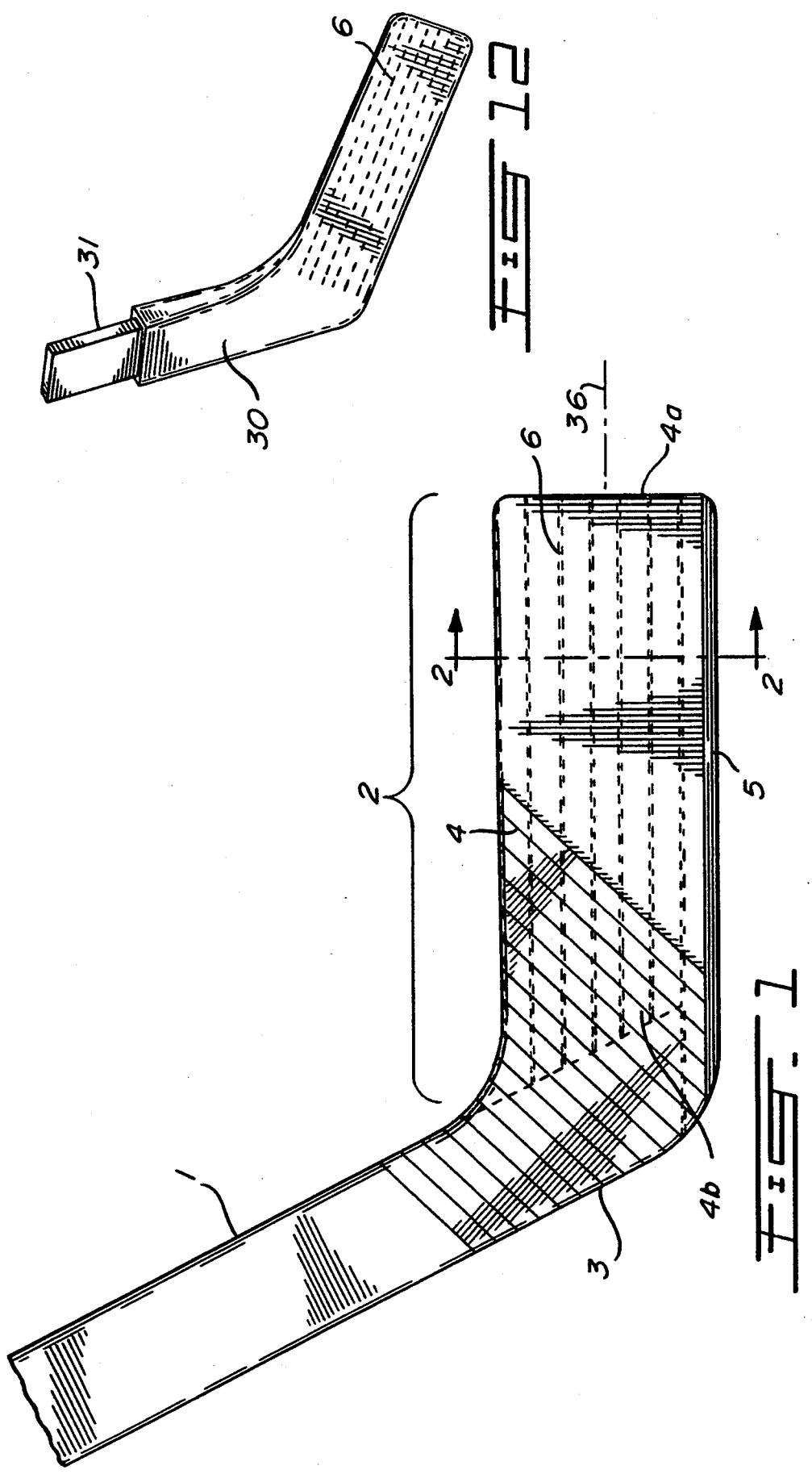

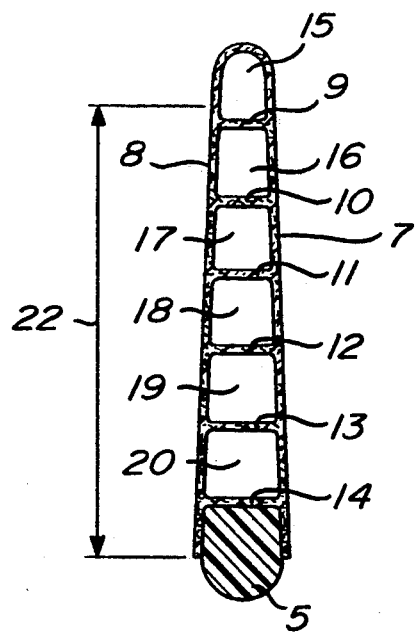
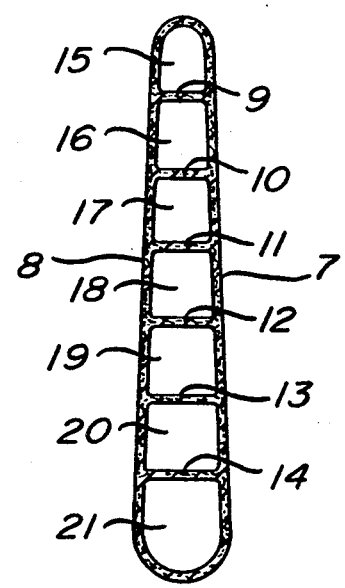
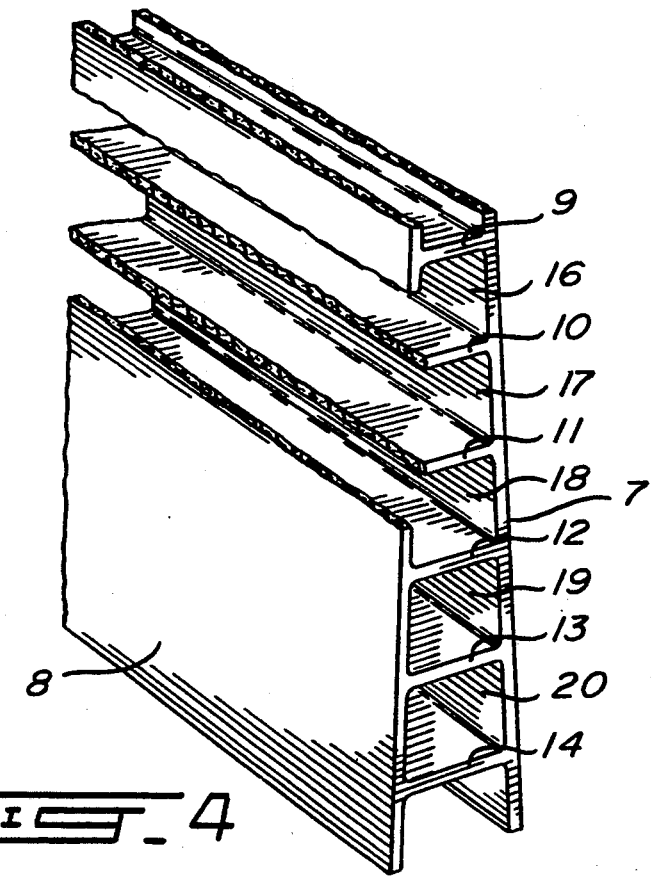

BLADE CONSTRUCT FOR A HOCKEY STICK OR THE LIKE

FIELD OF THE PRESENT INVENTION

The present invention relates to game stick blades and in particular to a composite blade construction for use with hockey sticks or the like; such sticks include, for example, ice hockey sticks (including goalie sticks), street hockey sticks and the like. The present invention, by way of example only, will be described hereinafter in relation to an ice hockey stick.

DESCRIPTION OF PRIOR ART

Ice hockey sticks generally consist of two basic elements, namely an elongated handle component and a blade secured to the lower end of the handle.

A blade of a hockey stick must be extremely strong in order for it to indure the tremendous forces developed between it and a puck. On the other hand, the blade must have a certain amount of flexibility so that the player has an acceptable level of "feel" while handling a puck or executing a shot. The optimum design of a blade furthermore includes a primary concave contact face which places a further limit on its construction; the blade also usually has a corresponding convex contact face which is more or less parallel to the concave face, i.e. in order to keep the weight of the blade low.

Many types of hockey sticks are presently known.

Traditional blades for ice hockey sticks are made of one or more pieces (e.g. layers) of wood. A shortcoming of wooden blades is that they are generally not strong enough and thus do not hold up well under the usual conditions encountered when playing hockey. Moreover, labour and material costs for the manufacture of wooden blades are relatively high.

A wooden blade may also be reinforced with fiber (e.g. glass) fabric which is impregnated and bonded to the wooden surface with a synthetic resin. These types of reinforced wooden blades have given good results including good playing performance; this performance is mainly the result of the combination of low weight and high stiffness.

Blades made entirely out of synthetic materials are also known; these include composite blades comprising a fiber (e.g. glass) laminated core (see for example U.S. Pat. Nos. 4,059,269, 4,488,721, 4,591,155, 4,600,192, Finnish Pat. No. 65018, etc.). However, difficulties are still encountered in providing a (synthetic) composite blade for a hockey stick that can withstand the substantial impacts to which it is subjected during use and yet provide a "feel" comparable to that of traditional wooden sticks when handling the puck and executing a shot. Plastic blades may, for example, have good strength characteristics but may have (high) weight, (low) wear and/or feel (i.e. low stiffness) characteristics which may be unacceptable to some players. It is possible, for example, to obtain a light weight blade having good stiffness by using a core of polyurethane foam, but, such a core may have a limited shear strength which may lead to internal fracture of the blade during use.

Accordingly, it would be advantageous to have an alternative composite blade construction for a hockey stick or the like which may be strong, durable, lightweight and of acceptable stiffness.

SUMMARY OF THE INVENTION

Generally, in accordance with the present invention, there is provided a blade element of composite construction which has a three dimensional fibre reinforcement structure, i.e. fiber reinforcement is oriented transversely between the (puck contact) face members such that the fiber reinforcement of the face members and those fibers transverse thereto form a three dimensional fiber reinforcement array embedded in a (suitable) resin matrix structure. Thus, the body of a blade element of the present invention may comprises a first face member and second opposed face member, both of fiber reinforced plastics material. These face members may be connected to each other by means of bridge or pillar members also of fiber reinforced plastics material, the bridge members being part of a core cavity member sandwiched between the face members. A transverse fiber component of the reinforcing fiber element of one or more of such bridge members contributes to the strength and stiffness of the construction. A blade element of such configuration may provide a durable structure while at the same time providing a player with the proper "feel" in handling the puck.

Accordingly, in a general aspect, the present invention provides a blade construct for a hockey stick or the like, said blade construct comprising a blade body having a first face member, and
a second opposed face member,
said first and second face members being spaced apart and being of fiber reinforced plastics material,
characterized in that,
a core cavity member is sandwiched between said face members,
said core cavity member comprises one or more bridge members of fiber reinforced plastics material,
said first face member, said second face member and said bridge members are integral, and
one or more of said bridge meters comprises a fiber reinforcing component oriented transversely with respect to said first and second face members.

In accordance with the present invention, the blade construct may, for example, have a plurality of bridge members. Thus, a blade construct may have a plurality of bridge members, one or more of which comprises a fiber reinforcing component oriented transversely with respect to the first and second face members. In accordance with the present invention, a blade construct may, in particular, have a plurality of bridge members, each of which comprises a fiber reinforcing component oriented transversely with respect to the first and second face members.

In accordance with the present invention, the weight (e.g. lightness) of the blade construct may vary as a function of the extent and structure of the core cavity member sandwiched between the opposed face members; i.e. the core cavity member may contribute to the lightness thereof. The core cavity member (apart from the bridge members thereof) may, for example, have a hollow (i.e. empty) aspect; alternatively, it may be filed with some lightweight material (e.g. a plastics foam material or the like) which may or may not, as desired, contribute to the structural integrity of the blade construct and which may or may not be integral with the bridge or face members. The core cavity member may, for example, comprise a pocket or a plurality of pockets which may be discrete or be interconnected in any desired fashion. The core cavity member may alternately comprise, for example, a plurality of (microspherical) hollows present so as to reduce the specific gravity of the construct. As used herein the expression "core cavity member" is to be understood as including the above aspects.

In accordance with the present invention, the strength of the blade construct will, inter alia, depend on the core cavity bridge members which are integral with the face members (e.g. glued thereto, formed integral thereto, etc.). The number of bridge members, the blade volume occupied by the core cavity member (e.g. the pocket(s) or hollows as mentioned above), the blade volume of the bridge members, the number of any pockets, etc. may be varied, as desired, in any suitable (known) manner, in accordance with the resin-fiber material and structure desired to be used for the face and bridge members. However, the configuration and structure of the bridge member(s), connecting the face members together, must be such as to adequately maintain the structural integrity of the blade construct in light of the ultimate environment of use of the blade.

With the above in mind, a core cavity member may take on any configuration whatsoever. As a consequence, the bridge members may, similarly, also take on any configuration (e.g. be post-like, rib-like, etc, in configuration) or orientation (e.g. perpendicular, angled, etc.) between the first and second face members.

A bridge member may, for example, have a rib-like aspect. A rib bridge member may extend longitudinally of the blade construct; the word "longitudinally" is to be understood herein as characterizing a rib bridge member as being oriented such that the ends thereof are directed more or less towards the tip and heel regions of the blade as against being oriented towards the top and bottom of the blade, the bottom of the blade being the part thereof intended to ride along a (ice) surface. A rib bridge member may extend more or less the entire length of the blade (i.e. from about the tip region of the blade construct to about the heel region of the blade construct) or it may be of some intermediate length and be disposed therebetween. A rib bridge member may have a straight or curved aspect. A rib bridge member may extend longitudinally more or less parallel to the (effective) longitudinal axis of the blade construct; a rib bridge member may, however, if desired, extend at an angle to the longitudinal axis.

A blade construct may have one or more of such rib bridge members.

Thus, in accordance with a particular aspect, the present invention provides a blade construct for a hockey stick or the like, said blade construct comprising a blade body having a first face member, and
   a second opposed face member,
   said first and second face members being spaced apart and being of fiber reinforced plastics material,
   characterized in that,
   a core cavity member is sandwiched between said first and second face members,
   said core cavity member comprises a plurality of spaced apart rib bridge members of fiber reinforced plastics material,
   said rib bridge members extend longitudinally of said blade body,
   said first face member, said second face member and said rib bridge members are integral, and
   one or more of said rib bridge members comprises a fiber reinforcing component oriented transversely with respect to said first and second face members.

As mentioned above, a core cavity member may take on any configuration whatsoever keeping in mind the above referred to aspects thereof. Accordingly, a core cavity member may comprise a bridge body of fiber reinforced plastics material having dispersed therein a plurality of hollows (e.g. microhollows) so as to provide the core cavity member with a cellular structure. The hollows may be present in a size and number sufficient to provide the blade construct with the desired specific gravity, strength, etc. In this case, the bridge member of the core cavity member may comprise a single integral bridge body element having included within its structure the hollows as well as the transversally disposed fiber reinforcing component. Apart from the transverse members, the core cavity member may in this case include a fiber reinforcing component oriented more or less parallel to the face members of the blade.

Thus, in accordance with an additional aspect, the present invention provides a blade construct for a hockey stick or the like, said blade construct comprising a blade body having a first face member, and
   a second opposed face member,
   said first and second face members being spaced apart and being of fiber reinforced plastics material,
   characterized in that,
   a core cavity member is sandwiched between said first and second face members,
   said core cavity member comprises a bridge body of fiber reinforced plastics material having dispersed therein a plurality of hollows so as to provide the core cavity member with a cellular structure,
   said first face member, said second face member and said bridge body are integral, and
   said bridge body comprises a fiber reinforcing component oriented transversely with respect to said first and second face members.

In accordance with the present invention the expressions "fiber component which is oriented transversely", "transverse fiber component" and the like are to be understood as referring to a non-parallel orientation (relative to the face members) of fiber component, i.e. the spatial disposition of such fiber component is such that the fiber component (i.e. a length dimension) is in a non-parallel relation with respect to the face members. The transverse fiber component may of course be one component of a fiber reinforcement element embedded in the resin matrix of a bridge member; other fiber component(s) may be disposed in different fashion i.e. in a more or less parallel fashion with respect to the face members. A bridge member and/or transverse fiber component thereof may, for example, be Oriented so as to provide, when the blade construct is viewed in cross-section, an aspect which is more or less perpendicular to the face members or some other angled aspect such as for example an aspect which includes a 45 degree angle.

In accordance with the present invention, a fiber reinforcing element of a bridge member may be disposed solely in the body of the bridge member. Alternatively a component of a fiber reinforcing element of a bridge member may merge with or be connected to the fiber reinforcement element of one or both face members. Thus a fiber reinforcing element of a bridge member may, for example, have a fiber component (or components) which is (are) connected at one end thereof to the transverse fiber reinforcement component while the other end of such coupler fiber component extends into the resin matrix of a face member, such end extension thus forming a component of the fiber reinforcement element of such respective face member. The fiber reinforcing element of a bridge member may, for example, comprise a part of a single continuous fiber body which includes all or part of the fiber reinforcing elements of the face members, i.e. the transverse fiber reinforcing component of a bridge member is connected to the fiber reinforcing elements of both face members. Accordingly, the word "connect(ed)" or the like (in relation to the transverse component) is to be understood herein in the context of such combinations.

Depending on the nature of the starting fiber material desired to be used to make the fiber reinforced composite blade construct, it may prove necessary, in order to obtain a desirable transverse orientation of a fiber component, to subject the fiber reinforcement material of the intended bridge member to some degree of tension during curing (i.e. of the resin). The underlying purpose of maintaining some degree of tension or stretching during curing is to inhibit such fiber component from being embedded in the resin matrix in a collapsed or folded state; accordingly the degree of tension on the embedded fiber component to accomplish this purpose may be so negligible as to constitute no tension at all. However, it may be desired to provide significant tension to a fiber component of an intended bridge member in order to have a tensioned fiber reinforcing component which is oriented transversely to the face members; i.e. to obtain a sort of prestressed bridge member analogous to a prestressed rod reinforced concrete body wherein the rods are maintained under tension during curing of the concrete matrix. Accordingly, as used herein the words "tension", "tensioned", or the like, are to be understood as characterizing a fiber reinforcing element (which is embedded in a resin matrix), as having been subjected to a degree of tension during curing of the initial fiber/resin combination, the degree of tension being predetermined in light of the above.

The blade construct, of the present invention, may, for example, be incorporated into a replaceable blade section. The replaceable blade section may be provided with a spigot member for releasable, mating engagement with a slot in one end of a handle section; if desired the blade section may have such a slot for similar engagement with a spigot at the end of a handle section; see, for example, U.S. Pat. Nos. 4,600,192, 4,488,721, 4,358,113 and 3,934,875 which show such spigot/slot type engagement means (the entire contents of these patents are incorporated herein by reference). Alternatively, the blade construct may be integrally attached to a handle in any suitable (known) manner; for example the blade construct when formed may be directly fixed to the handle by fiber-reinforce plastics material (see for example U.S. Pat. Nos. 4,591,155 and 4,059,269, the entire contents of which are incorporated herein by reference). The handle section itself may take any suitable (known) form or configuration.

Thus, in accordance with a particular aspect of the present invention there is provided a hockey stick comprising a handle and a blade, said blade comprising a blade body having
  a first face member, and
  a second opposed face member,
  said first and second face members being spaced apart and being of fiber reinforced plastics material,
  characterized in that,
  a core cavity member is sandwiched between said first and second face members,
  said core cavity member comprises one or more bridge members of fiber reinforced plastics material,
  said first face member, said second face member and said bridge members are integral, and
  one or more of said bridge members comprises a fiber reinforcing component oriented transversely with respect to said first and second face members.

In accordance with a further particular aspect the present invention provides a hockey stick comprising a handle and a blade, said blade comprising a blade body having
  a first face member, and
  a second opposed face member,
  said first and second face members being spaced apart and being of fiber reinforced plastics material,
  characterized in that,
  a core cavity member is sandwiched between said first and second face members,
  said core cavity member comprises a plurality of spaced apart rib bridge members of fiber reinforced plastics material,
  said rib bridge members extend longitudinally of said blade,
  said first face member, said second face member and said rib bridge members are integral, and
  each said rib bridge member comprises a fiber reinforcing component oriented transversely with respect to said first and second face members.

According to the present invention, the blade construct may be made in any suitable manner, whatsoever, provided that the necessary core cavity bridge structure is achieved for connecting the face members together. If desired a shaft may be secured to the blade construct by suitable resin impregnated fiber reinforcing plastics layers extending from the face members and the obtained green combination cured in a press mold to form the desired hockey stick.

In accordance with the present invention the fiber reinforced plastics material of the face and bridge members may be composed of a suitable (known) resin and a suitable (known) fiber reinforcement element; the resin may, for example, be a polyester or epoxy resin while the fiber reinforcement element may, for example, be of glass fibers, carbon fibers, organic (polyamide) fibers, etc. A fiber reinforcement element which may be used in the context of the present invention may take any suitable (known) form, such as, for example, fiber strands, a fabric (e.g. a woven or non-woven fabric), etc.

In accordance with the present invention the face members may be built up in any suitable (known) manner from resin and fiber reinforcement elements keeping in mind, however, the stress, shock, etc., to which they will be subjected during use. The fiber element may comprise one or more fiber (mat) layers.

The blade construct may, for example, be built up using a suitable preform which makes allowance for the formation of the required core cavity bridge structure.

If bridge members having the aspect of a plurality of longitudinally extending ribs are desired, a rib preform may, for example, comprise a channelled fabric of reinforcing fibers wherein interconnected fabric channels are disposed about suitable elongated support or filler members, the filler members being configured to tend to maintain fibers of each channel disposed between adjacent filler members in a (tensioned) transverse orientation during the curing and shaping stage of the fabrication process i.e. transverse relative to the face members of the final product.

A reinforcing fabric for such a rib preform may, for example, comprise reinforcing fibers or fiber strands woven into a two layered channelled fabric; the warps of the two layers of fabric criss-crossing each other forming fabric channels between a pair of cross-over points.

The interconnected fabric channels of such a rib preform may be filled with flexible foam stripes of plastics material, thermoplastic rigid foam stripes, (removable) thin walled pressure hoses, etc.; e.g. strips of polyurethane foam, one or more slabs of polyurethane foam, etc. Under the desired curing conditions, a flexible or thermoplastic rigid foam must facilitate imparting to the blade construct, the shape and thickness of the mold form; e.g. a thermoplastic foam should soften at the mold temperatures used. If the channels are filled with pressure hoses these have to be able to be (de)pressurised during the molding operation so that the blade construct takes the thickness and shape of the mold.

Filler members may be disposed in the fabric channels during the weaving of the two layered fabric or can be disposed therein thereafter.

The channelled fabric for the above mentioned rib preform may be pre-impregnated with a suitable resin such as an epoxy resin or the like. The resin in the crossover fabric region between adjacent filler members is intended-, once cured, to have imbedded therein a transverse fibre reinforcing component; i.e. in the cured hardened state this portion of the resin defines a resin matrix for the core cavity bridge members of the present invention which connect the face members together.

The above described rib preform, comprising the channelled fabric, the filler members and resin may be moulded into a hockey stick blade of the desired shape and thickness, any necessary or desired additional layers of resin impregnated reinforcing fabric being previously added to both of the opposed faces thereof.

After curing the reinforcing fabric elements and resin between the filler members form a composite bridge structure holding the spaced opposed face members together; the rib bridge members have a reinforcing fiber component extending therethrough transverse to the face members.

Instead of interconnected fabric channels a plurality of independent fabric covered foam strips may for example be used to make a rib preform. Thus stripes of flexible foam plastic, thermoplastic rigid foam or thin walled pressure hoses may be covered with a sock type of reinforcing fiber fabric. The weave of the fabric sock can be such that the webs thereof run in a controlled angle with respect to the longitudinal axis of the strip(s). For instance they may be at a 45 degree angle so as to enhance shear stress resistance. Several of these "sausages" type members, (the fabric thereof impregnated with a suitable resin) may be lain side by side sandwiched between outer layers of resin impregnated fabric and cured in a mold as mentioned above to provide a blade construct having core cavity rib bridge members.

Alternatively a rib preform may be constructed from several stripes of rigid foam which can be either pre-shaped or thermoplastic. A preimpregnated layer of reinforcing fiber fabric or mat may be lain about the strips in intertwining fashion so that the fabric runs along the first outer surface of a first strip, between the first strip and an adjacent second strip, over the second outer surface of the second strip, between the second stripe and a third stripe, along the first outer surface of the third strip and so on. The rest of the above example methodology may then be followed.

In accordance with a further possible preform structure, layers of reinforcing fiber fabric or mat may be knitted together with a plurality of reinforcing fiber thread or strands which run through both layers and which have a certain length such that the layers may be held apart from each other with a suitable springy distance holding member such as mentioned above; i.e. the knitting is loose enough to allow the layers to be spaced apart a certain distance. This three dimensional preform may then be placed into a mold which is filled with expanding polyurethane or epoxy resin, etc.

The joining of the blade construct to a hockey shaft or the like may take place in known fashion (see for example U.S. Pat. No. 4,059,269). Thus, for example resin impregnated fiber fabric may be disposed over each of the opposed face surfaces of a preform so as to provide flap portions which may extend over the tapered lower end of a hockey shaft, the end being configured to define part of the heel end of the intended blade. Thereafter, the whole may be cured in a pressure mold to harden the fiber reinforced layer about the end of the handle. The shaft may be of wood, of synthetic material or even a lightweight metal material such as aluminum.

Finally, the blade construct or hockey stick of the present invention may be worked to remove any excess glue material including fiber material that extends beyond the edges the blade. This can be done in a conventional manner such as by cutting, sanding or grinding. This method is well known in the art.

DESCRIPTION OF DRAWINGS

Example embodiments of the invention are illustrated by way of example only in the accompanying drawings wherein:

FIG. 1 is a schematic side elevation view showing a hockey stick incorporating an example embodiment of a blade construct in accordance with the present invention;

FIG. 2 is a cross-sectional view of the blade construct shown in FIG. 1 taken along line 2—2 of FIG. 1;

FIG. 3 shows a cross-sectional view the same as that of FIG. 2 but illustrating an alternate structure for the blade construct having a wrap around bottom instead of a wear protection bottom piece;

FIG. 4 shows a detailed partial perspective view of the blade construct of the hockey stick of FIG. 1, wherein a portion of a face member is removed to expose a number of the bridge members and pockets of the core cavity member;

FIG. 12 illustrates an example embodiment of a replaceable blade section which incorporates a blade construct of the present invention.

Referring to FIG. 1, a hockey stick blade is shown which incorporates a blade construct of the present invention. The stick comprises a handle section 1 and a blade section indicated generally by the reference numeral 2; for illustration purposes, only a portion of the handle 1 is shown. The blade section 2 comprises a blade construct of the present invention (as shall be explained hereinafter). The lower portion 3 of the handle 1 is attached to the blade section 2 by a fiber reinforced plastics material layer 4 shown as crossed hatching. Although it is not so shown the layer 4 extends right up to the tip 4a of the blade; a similar layer is disposed of the opposite face of the blade. These outer fiber reinforced plastic layers 4 form part of opposed face members of the blade construct as shall be seen below.

Figure 5:
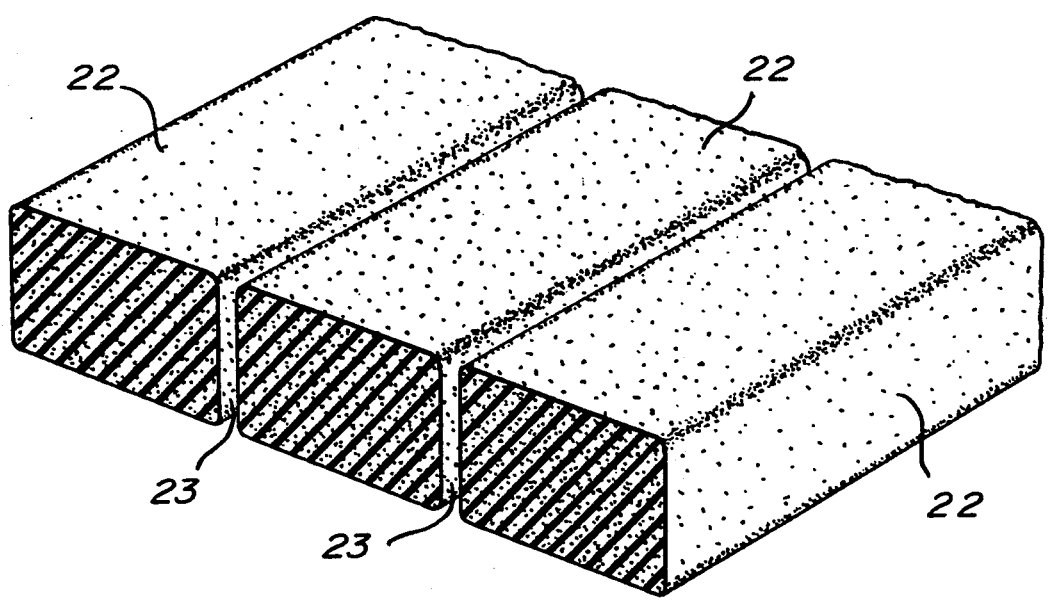
FIG. 5 illustrates a number of fiber support strips or fillers.

The blade as shown in FIG. 1 also includes a wear resistant member 5 for contacting the ice surface (see U.S. Pat. No. 3,982,760 for a further discussion of such members, the entire contents of this patent is incorporate herein by reference), this member may take the aspect of a thermoplastic wear protection bottom piece.

In FIG. 1, the rib bridge members are shown in longitudinally extending outline by the dotted lines 6 (in FIG. 1, only one of the longitudinally extending dotted lines is so designated).

Turning to FIG. 2, this figure shows a cross-section of the blade construct of the ice hockey stick illustrated in FIG. 1. For illustration purposes, the fiber elements, which are part of the structure of the blade, are not shown. As can be seen, the blade has a first face member 7 and a second opposed face member 8. The core cavity member comprises the rib bridge members designated by the reference numerals 9, 10, 11, 12, 13 and 14 and includes elongated pockets 15, 16, 17, 18, 19 and 20 (see also FIG. 4); as may be seen, the elongated pockets are delineated by respective portions of the opposed face members and by the rib bridge members.

FIG. 3 illustrates a blade structure which is essentially the same as that of the blade structure shown for FIGS. 1 and 2, except that this alternate blade structure does not include a lower wear resistant member 5; in its place, there is a further pocket 21 (since the structure of the embodiment illustrated by FIG. 3 is essentially the same as that embodiment shown in FIGS. 1 and 2, the same reference numerals have been used with respect thereto to designate the various elements thereof).

Referring to FIGS. 2 and 4, FIG. 4 shows a partial perspective view of a portion of the blade body indicated generally by the arrow designated 22 in FIG. 2.

As can be seen from FIGS. 2 and 4, the various rib bridge members and the face members are configured such that they delineate the pockets 15 to 20. The rib bridge members extend longitudinally of the blade in the manner illustrated generally by the dotted lines 6 in FIG. 1. Each pocket is spaced or separated from an adjacent pocket by a corresponding rib bridge member; for example, the pockets 16 and 17 are separated from each other by the bridge member 10. The pockets as seen also extend longitudinally of the blade. The pockets are closed off at the tip 4a by fiber reinforced material and at the heel region by the lower portion 3 of the handle 1.

As mentioned above, the face members 7 and 8 as well as the bridge members 9 to 14 and the tip 4a are of a fiber reinforcement plastic material. In FIGS. 2, 3 and 4, only the basic structure is shown without any attempt to show the disposition of fiber elements or components embedded in the resin matrix structure.

FIGS. 2 and 3, for illustration purposes only, show the pockets as being hollow or empty. Although this is a possible version of the core cavity member, the pockets for the embodiment (s) shown in FIGS. 1 to 4 may be filed with a light (polyurethane) foam material (not shown) not intended to provide structural support for the blade construct but for maintaining a fiber component in the bridge member in a transverse (e.g. tensioned) configuration during curing (as shall be explained hereinafter).

A blade construct having longitudinally extending rib bridge members and elongated pockets having light foam material disposed therein may be built up using example intermediate structures such as illustrated in FIGS. 5, 6, 7 and 8.

Referring to FIGS. 5, the intermediate structures for building up the required bridges members include a number of elongated filler strips or inserts 22 (only three are shown and not in their entire length). As mentioned above the strips 22 may be of flexible foam or thermoplastic rigid foam which softens during moulding such that in either case the final intermediate structure may be shaped and cured in a pressure mould to provide the blade construct of desired shape and thickness. The foam strips 22 are disposed such that they are spaced apart so as to leave spaces 23 between adjacent foam strips 22. The strips 22 are maintained in this position by being engaged in respective elongated channels defined by a two layered fabric material which is woven into a channelled fabric having a plurality of elongated channels.

Figure 6:
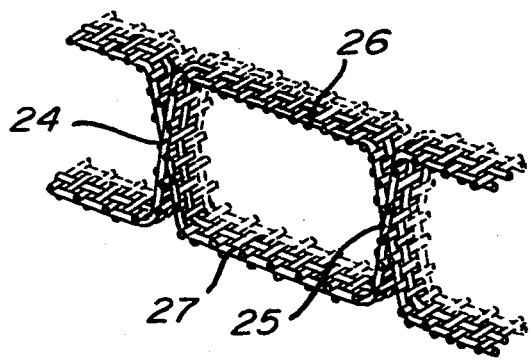
FIG. 6 illustrates a channelled fabric of reinforcing fiber for incorporation into the bridge members as well as the face members of the example embodiment of a blade construct shown in FIG. 1.

Referring to FIG. 6, a portion of such a channelled fabric is shown. As can be seen, each of the channels of the fabric is formed by opposed cross-over weave members designated 24 and 25 and upper and lower weave members 26 and 27 which connect up with the cross-over weave members 24 and 25. The channelled fabric comprises a plurality of interwoven fiber (e.g. glass) strands and is impregnated with a suitable resin (e.g. an epoxy resin). Some of the strands of fabric run parallel to the lengthwise dimension of the channels, while a second set of strands run perpendicular to the lengthwise dimension i.e. the perpendicularly running strands of the cross over members are to be disposed transverse to the face members in the blade construct.

Figure 7:
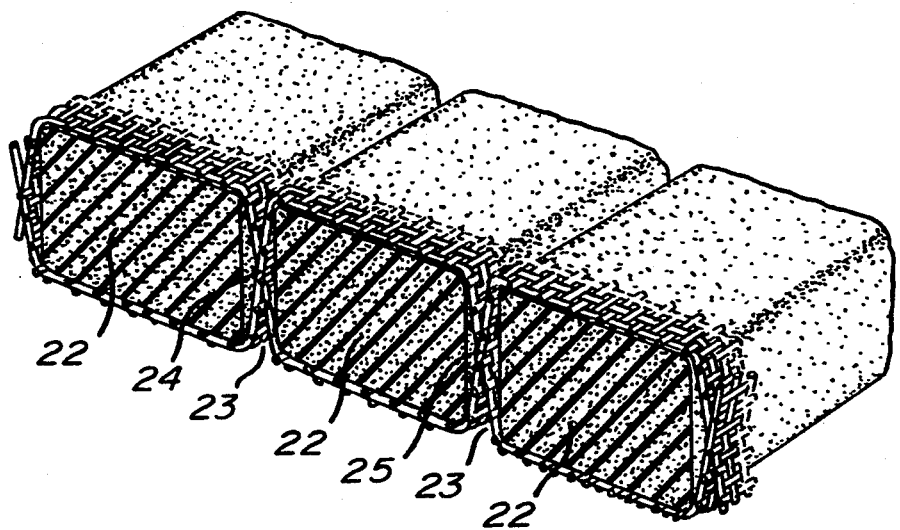
FIG. 7 illustrates an intermediate assembly (i.e. rib preform) comprising the fabric and support strips as shown in FIGS. 5 and 6.

FIG. 7 illustrates a portion of an example embodiment of a rib preform comprising the fabric and strips of FIGS. 5 and 6. As can be seen, the spaces 23 between the strips 22 are occupied by cross-over fiber members (e.g. cross-over members 24 and 25). As may also be appreciated, the cross-sectional thickness of the strips 22 is such that they fill the elongated channels of the channelled fabric sufficiently to maintain the perpendicular strands of the cross-over members 24 and 25 in a (e.g. tensioned) transverse state during curing of the resin. Sufficient resin is pre-applied to the channelled fabric such that after curing, the spaces between the strips 22 are occupied by a fiber reinforcing plastic material defining the rib bridging members which connect the face members 7 and 8 together. The number of channel/strip pairs for building the blade construct of FIG. 1 is six. The longitudinal length of the channel/strip pairs is sufficient to provide a blade body having the desired length; the channel/strip pairs for the example blade construct are disposed so as to provide bridge members of a more or less longitudinally straight aspect; the channel/strip members may of course be configured to provide a desired longitudinal extending curved aspect i.e. the bridge members still effectively extending longitudinally as described above. The channel fabric of each of the end or outermost channel/strip members of the preform may be tied off or connected at the junction of the crossover members (i.e. terminated) in any suitable manner since there is no adjacent strip around which the fabric to be wrapped.

Figure 8:
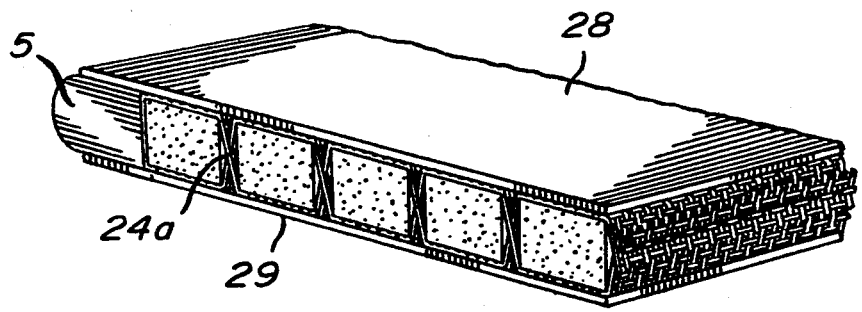
FIG. 8 shows a partial detailed view of an intermediate structure of a blade construct prior to curing.

A rib preform as illustrated in FIG. 7 is, thereafter, as shown in FIG. 8 (only five of the six channel/strip pairs for the blade construct of FIG. 1 are shown), overlain with reinforcing fabric layers 28 and 29 i.e. the channelled fabric and foam strip combination is sandwiched between the reinforcing fabric 28 and 29. The reinforcing fabric 28 and 29 is also impregnated with a suitable resin. In the embodiment shown, the face members 7 and 8 of the cured construct will comprise the respective reinforced plastic layers 28 and 29 as well as the portions 26 and 27 of the channel/strip members of the rib preform.

The fabric 28 and 29 are sized to extend beyond the outer edges of the rib preform. In this manner the top member and tip member of the blade may be formed by molding and curing the excess fabric to wrap around these areas of the blade core; the excess material being removed (e.g. by grinding, etc.) after curing.

A wear resistant (e.g. thermoplastic) member 5 is disposed adjacent to an end channel/strip member, the excess reinforced plastic layers 28 and 29 in this region being disposed to overlap the resistant members 5 (see FIG. 8) so that the member 5 will be fixed to and form part of the bottom member of the blade structure (see for example U.S. Pat. No. 3,982,760 with respect to the incorporation of a lower resistant member into a hockey blade).

With respect to the hockey stick embodiment as shown in FIG. 1, the heel end of the final intermediate structure may be configured as shown in FIG. 1 so as to matingly contact with the lower end 3 of the handle section 1. Thus the excess reinforcing plastic layers 28 and 29 in this region of the intermediate structure will be extended to overlap the handle portion 3 so that the entire stick may be placed into a suitably formed mold and the handle immediately formed integral with the blade construct during curing of the blade construct. In FIG. 1, the overlapping portion or region of the fiber reinforced layers 28 is designated or referred to by the reference numeral 4b. The handle member may be of wood, of a composite material, etc.

The combined elements as shown in FIG. 8 is thereafter cured (along with the handle element) using a mould which will subject the combination to a suitable temperature and pressure for curing the resin and shaping the blade construct into the shape and thickness of a desired blade for a hockey stick.

After curing, the perpendicular rib bridge members will consist of a cured resin having embedded therein the criss-cross weave members (e.g. members 24 and 25) with the strands thereof extending transversally with respect to the face members 7 and 8 (see for example the element designated by the reference number 24a in FIG. 8). Once the precursor combination is cured, the elongated pockets of the core cavity member will each be filled with a respective foam strip material. For this embodiment, the rib bridge members are more or less parallel to the longitudinal axis of the blade construct; the rib bridge members could of course extend longitudinally with respect to the blade construct at some angle to the longitudinally axis 36 (see FIG. 1).

Referring to FIG. 12 (on the same sheet of drawings as FIG. 1), instead of a complete handle section 1 being integrally fixed to the blade construct, a handle heel portion 30 having a spigot member 31 may be so fixed to the blade construct. In this way, a replaceable blade section may be obtained which can thereafter matingly and replaceably be fixed to a handle having a corresponding slot at one end thereof.

Referring to FIG. 3, the wear member 5 may be omitted. In this case the bottom running or sliding edge of the blade may be formed by the excess fiber reinforced fabric layers 28 and 29 in this region of the intermediate structure. Thus, during moulding, the fiber reinforced layers of this excess region are (as in the case of the top and tip regions) pinched towards each other and cured any excess material being thereafter removed to obtain the desired shape of the bottom member of the blade.

Figure 9:
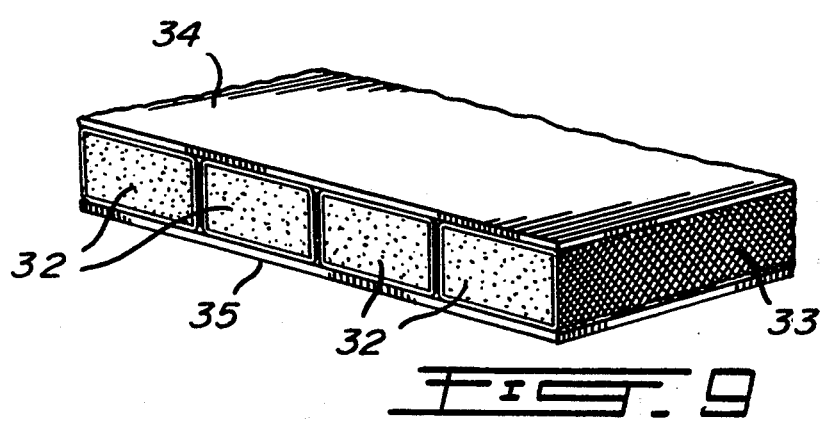
FIGS. 9, 10 and 11 illustrate alternative example intermediate structures prior to curing for the formation of a blade construct in accordable with the present invention.

Referring to FIG. 9, this figure shows another possible rib preform for making the blade construct wherein rib bridge members 5 have embedded therein fiber elements which extend transversally with respect to the face members of the construct. In the preform embodiment shown, the flexible strips 32 are covered with a sock type reinforcing fabric 33. The webs of the sock fabric 33 can run at a controlled angle (e.g. 45°) with respect to the longitudinal axis of the strips (i.e. the weave is of a criss-cross configuration). The fibers of the sock of each of these individual sausage like channel/strip elements may be impregnated with a suitable resin. In order to make the blade construct a number of these appropriately sized and configured "sausages" may be lain side by side sandwiched between appropriate reinforced plastic layers 34 and 35. The sausages are laid side by side so as to obtain a blade construct wherein the bridge members extend longitudinally of the blade construct therebetween.

Figure 10:
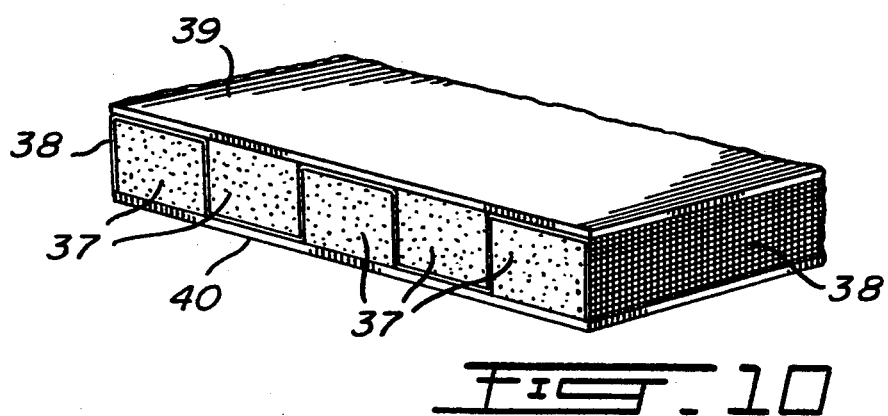

A FIG. 10 shows a further possible way of building up rib bridge members having the required transverse fiber elements embedded therein. In this rib preform embodiment, a number of strips of rigid foam are disposed side by side such that a single preimpregnated layer of reinforcing fiber fabric or material 38 is layered or intertwined in a continuous fashion around these core strips such that the layer runs from a first side of one strip down between adjacent strips to the opposite surface of the adjacent strip, etc. The blade construct of this version also includes fiber reinforcing fabric layers 39 and 40 such that the blade construct may be cured as mentioned above.

Returning to FIG. 11, this Figure shows a further possible structure for the intermediate fabric thermoplastic strip combination. In this case, the upper and lower (resin impregnated) fabric layers 41 and 42 respectively are spaced apart by a suitable (rigid) foam material 43 (partially shown) such as for example a polyurethane foam slab. The upper and lower fabric layers 41 and 42 are then knitted together by strands 44 of fiber material. The foam slab will hold apart the reinforcing fiber layers 41 and 42 during curing and moulding so as to obtain the required bridge members spacing the facing members apart and which have transversally extending fabric strands embedded in the bridge members. In this case, the bridge members will take on a post-like configuration since during curring resin will flow by capillary action over the transverse strands or threads 44 such that on curring the threads will be encased in a resin matrix, i.e. the core cavity member will have a plurality of spaced bridge members of post-like configuration.

Figure 11:
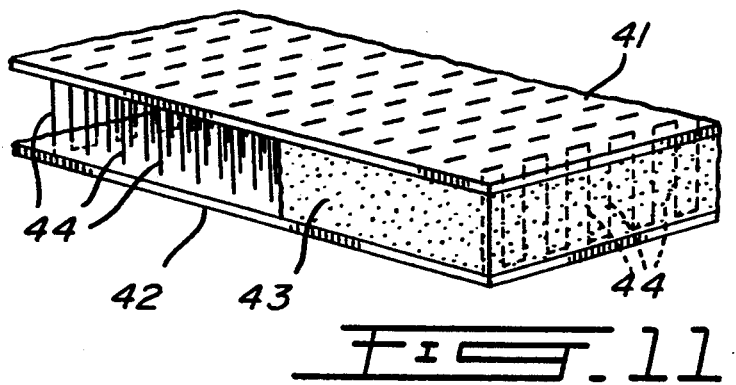

In accordance with an alternative form for the structure shown in FIG. 11 the foam material 43 may be replaced by a core member which is built up starting from a plurality of layers (e.g. three or more) of reinforcing fiber material. However, at least one of the reinforcing fiber layers of the core cavity member of this structure comprises thermoplastic hollow (micro)spheres which are embedded in the interstices between the fiber. These hollow (micro)spheres serve as a type of filler in order to reduce the specific gravity of the final construct; the (micro)spheres may be present in any desired number and size keeping in mind the role of the spheres is to provide the central core with pockets of empty spaces so as to reduce the (specific) weight of the construct while providing a construct with an acceptable level of strength, resistance, etc. The hollow spheres, may, for example, have a size ranging from 0.01 mm to 0.05 mm.

Suitable types of laminateable core material comprising microspheres are available from Spezialprodukte fur Leichtlaminaten GmbH, Germany. These products are sold under the names "Spherecore" and/or "Spheremat"; these products comprise glass fiber and thermoplastic hollow microspheres disposed in the interstices of the fibers.

In accordance with this alternate structure, suitable numbers of central layers are laid on top of each other keeping in mind the desired thickness of the blade. The layers may all comprise fiber material with the thermoplastic spheres or some of the layers as desired may comprise conventional fiber layers without such spheres; the proportion of the various types of layers will depend on the specific gravity it is desired to have in the end product. As in the case of the embodiment illustrated in FIG. 11, outside layers 41 and 42 would be provided which would be stitched together through the central core fiber layers using a suitable thread like material (e.g. glass fiber or some other high modulus fiber) in order to form the transverse fiber reinforcing component connecting the first surface layer to the second surface layer.

Thereafter, the over all combination may be impregnated with a low viscosity epoxy or polyester resin and then cured and pressed in a mould to the desired shape of the hockey stick blade. The cured plurality of central layers of fiber mat or woven fabric would provide the basic core cavity member with a cellular structure, i.e. a structure comprising a plurality of hollows or cavities.

With this latter type of structure, the specific gravity of the blade may, for example, be reduced to a level of about 0.85. The amount of the layer material comprising the microspheres may be determined in light of the desired degree of weight, stiffness and strength desired in the final structure.

What is claimed is:

1. A blade construct for a hockey stick, said blade construct comprising a blade body having
   a first face member, and
   a second opposed face member,
   said first and second face members being spaced apart and being of fiber reinforced plastics material, characterized in that,
   a core cavity member is sandwiched between said first and second face members,
   said core cavity member comprises one or more bridge members of fiber reinforced plastics material,
   said first face member, said second face member and said bridge members are integral, and
   one or more of said bridge members comprises a fiber reinforcing component oriented transversely with respect to said first and second face members.

2. A blade construct as defined in claim 1 characterized in that said cavity member comprises a plurality of said bridge members and a plurality of the bridge members comprise a fiber reinforcing component oriented transversely with respect to said first and second face members.

3. A blade construct as defined in claim 1 characterized in that said cavity member comprises a plurality of said bridge members, each of the bridge members of said plurality of bridge members comprising a fiber reinforcing component oriented transversely with respect to said first and second face members.

4. A blade construct as defined in claim 1 characterized in that, each transversely oriented fiber reinforcing component is connected to a fiber reinforcing component of at least one of said first and said second face members.

5. A blade construct as defined in claim 1 characterized in that one or more of said bridge members comprises a tensioned fiber reinforcing component oriented transversely with respect to said first and second face members.

6. A blade construct as defined in claim 3 characterized in that, each transversely oriented fiber reinforcing component is connected to a fiber reinforcing component of said first face member and of said second face member.

7. A blade construct as defined in claim 5 characterized in that, each transversely oriented fiber reinforcing component is connected to a fiber reinforcing component of said first face member and of said second face member.

8. A blade construct for a hockey stick, said blade construct comprising a blade body having
   a first face member, and
   a second opposed face member,
   said first and second face members being spaced apart and being of fiber reinforced plastics material, characterized in that,
   a core cavity member is sandwiched between said first and second face members,
   said core cavity member comprises a plurality of spaced apart rib bridge members of fiber reinforced plastics material,
   said rib bridge members extend longitudinally of said blade body,
   said first face member, said second face member and said rib bridge members are integral, and
   one or more of said rib bridge members comprises a fiber reinforcing component oriented transversely with respect to said first and second face members.

9. A blade construct as defined in claim 8 characterized in that said cavity member comprises a plurality of said rib bridge members, each of the bridge members of said plurality of bridge members comprising a fiber reinforcing component oriented transversely with respect to said first and second face members.

10. A blade construct as defined in claim 8 characterized in that, each transversely oriented fiber reinforcing component is connected to a fiber reinforcing component of at least one of said first and said second face members.

11. A blade construct as defined in claim 8 characterized in that one or more of said rib bridge members comprises a tensioned fiber reinforcing component oriented transversely with respect to said first and second face members.

12. A blade construct as defined in claim 9 characterized in that, each transversely oriented fiber reinforcing component is connected to a fiber reinforcing component of said first face member and of said second face member.

13. A blade construct as defined in claim 11 characterized in that, each transversely oriented fiber reinforcing component is connected to a fiber reinforcing component of said first face member and of said second face member.

14. A blade construct as defined in claim 9 characterized in that each said rib bridge member comprises a tensioned fiber reinforcing component oriented transversely with respect to said first and second face members and each transversely oriented fiber reinforcing component is connected to a fiber reinforcing component of said first face member and of said second face member.

15. A hockey stick comprising a handle and a blade, said blade comprising a blade body having
a first face member, and
a second opposed face member,
said first and second face members being spaced apart and being of fiber reinforced plastics material,
characterized in that,
a core cavity member is sandwiched between said first and second face members,
said core cavity member comprises one or more bridge members of fiber reinforced plastics material,
said first face member, said second face member and said bridge members are integral, and
one or more of said bridge members comprises a fiber reinforcing component oriented transversely with respect to said first and second face members.

16. A hockey stick as defined in claim 15 characterized in that said cavity member comprises a plurality of said bridge members and a plurality of the bridge members comprise a fiber reinforcing component oriented transversely with respect to said first and second face members.

17. A hockey stick as defined in claim 15 characterized in that said cavity member comprises a plurality of said bridge members, each of the bridge members of said plurality of bridge members comprising a fiber reinforcing component oriented transversely with respect to said first and second face members.

18. A hockey stick as defined in claim 15 characterized in that, each transversely oriented fiber reinforcing component is connected to a fiber reinforcing component of at least one of said first and said second face members.

19. A hockey stick as defined in claim 15 characterized in that one or more of said bridge members comprises a tensioned fiber reinforcing component oriented transversely with respect to said first and second face members.

20. A hockey stick as defined in claim 17 characterized in that, each transversely oriented fiber reinforcing component is connected to a fiber reinforcing component of said first face member and of said second face member.

21. A hockey stick as defined in claim 19 characterized in that, each transversely oriented fiber reinforcing component is connected to a fiber reinforcing component of said first face member and of said second face member.

22. A hockey stick comprising a handle and a blade, said blade comprising a blade body having
a first face member, and
a second opposed face member,
said first and second face members being spaced apart and being of fiber reinforced plastics material,
characterized in that,
a core cavity member is sandwiched between said first and second face members,
said core cavity member comprises a plurality of spaced apart rib bridge members of fiber reinforced plastics material,
said rib bridge members extend longitudinally of said blade,,
said first face member, said second face member and said rib bridge members are integral, and
one or more of said rib bridge members comprises a fiber reinforcing component oriented transversely with respect to said first and second face members.

23. A hockey stick as defined in claim 22 characterized in that said cavity member comprises a plurality of said rib bridge members, each of the rib bridge members of said plurality of rib bridge members comprising a fiber reinforcing component oriented transversely with respect to said first and second face members.

24. A hockey stick as defined in claim 22 characterized in that, each transversely oriented fiber reinforcing component is connected to a fiber reinforcing component of at least one of said first and said second face members.

25. A hockey stick as defined in claim 22 characterized in that one or more of said rib bridge members comprises a tensioned fiber reinforcing component oriented transversely with respect to said first and second face members.

26. A hockey stick as defined in claim 23 characterized in that, each transversely oriented fiber reinforcing component is connected to a fiber reinforcing component of said first face member and of said second face member.

27. A hockey stick as defined in claim 25 characterized in that, each transversely oriented fiber reinforcing component is connected to a fiber reinforcing component of said first face member and of said second face member.

28. A hockey stick as defined in claim 23 characterized in that each said rib bridge member comprises a tensioned fiber reinforcing component oriented transversely with respect to said first and second face members and each transversely oriented fiber reinforcing component is connected to a fiber reinforcing component of said first face member and of said second face member.

29. A blade construct for a hockey stick, said blade construct comprising a blade body having
a first face member, and a second opposed face member, said first and second face members being spaced apart and being of fiber reinforced plastics material, characterized in that, a core cavity member is sandwiched between said first and second face members, said core cavity member comprises a bridge body of fiber reinforced plastics material having dispersed therein a plurality of hollows so as to provide the core cavity member with a cellular structure, said first face member, said second face member and said bridge body are integral, and said bridge body comprises a fiber reinforcing component oriented transversely with respect to said first and second face members.

30. A blade construct as defined in claim 29 characterized in that said hollows are microhollows.

31. A blade construct as defined in claim 29, characterized in that the bridge body comprises a tensioned fiber reinforcing component oriented transversely with respect to said first and second face members.

* * * * *